United States Patent [19]

Graef

[11] 4,379,628
[45] Apr. 12, 1983

[54] FOLDING TRANSPARENCY (MICROFICHE) VIEWER

[75] Inventor: John N. Graef, West Bend, Wis.
[73] Assignee: Realist, Inc., Menomonee Falls, Wis.
[21] Appl. No.: 291,247
[22] Filed: Aug. 10, 1981
[51] Int. Cl.³ .............................................. G03B 21/30
[52] U.S. Cl. ...................................... 353/73; 353/79; 353/27 R; 353/119; 40/365
[58] Field of Search ................... 353/78, 79, 119, 74, 353/76, 77, 72, 98, 99, 27 R, 122, 73; 40/361, 40/362, 363, 365, 366, 367; 350/123, 296

[56] References Cited

U.S. PATENT DOCUMENTS

| | | | |
|---|---|---|---|
| 2,258,382 | 10/1941 | Goebel | 353/79 |
| 2,484,379 | 10/1949 | Goldberg | 353/79 |
| 2,495,047 | 1/1950 | Afton et al. | 40/362 |
| 3,669,534 | 6/1972 | Hoffman et al. | 353/21 |
| 3,893,759 | 7/1975 | Crew | 353/99 X |
| 3,899,246 | 8/1975 | Edelstein | 353/78 X |
| 4,234,244 | 11/1980 | Klein | 40/363 X |
| 4,294,515 | 10/1981 | Kaufman | 350/296 |

FOREIGN PATENT DOCUMENTS

| | | | |
|---|---|---|---|
| 538350 | 3/1922 | France | 353/79 |
| 929740 | 7/1947 | France | 353/79 |
| 2412089 | 8/1979 | France | 40/363 |
| 534675 | 10/1955 | Italy | 353/79 |

Primary Examiner—Stephen Marcus
Assistant Examiner—William R. Sharp
Attorney, Agent, or Firm—Bayard H. Michael

[57] ABSTRACT

The film image is illuminated by the bulb or by ambient light admitted through an aperture on the top of the viewer. The image is projected on a folded light path onto a screen pivotally mounted on the underside of the upper housing to depend into the viewing chamber in the lower housing. The lower housing is pivotally connected to the upper housing and contains a power mirror reflecting the image on the screen into the eyes of the user. When the lower housing is folded (collapsed) over the upper housing the screen pivots into the space between the housings. The screen pivot is moveable to change the screen distance from the power mirror (and the film stage), to adjust the toe-in required of the viewers' eyes for optimism viewing comfort. The microfiche carrier mechanism is generally U-shaped to straddle the light path to the film stage and is positively driven back and forth relative to the housing film stage and engages the fiche on each side of the light path to move the fiche laterally.

10 Claims, 15 Drawing Figures

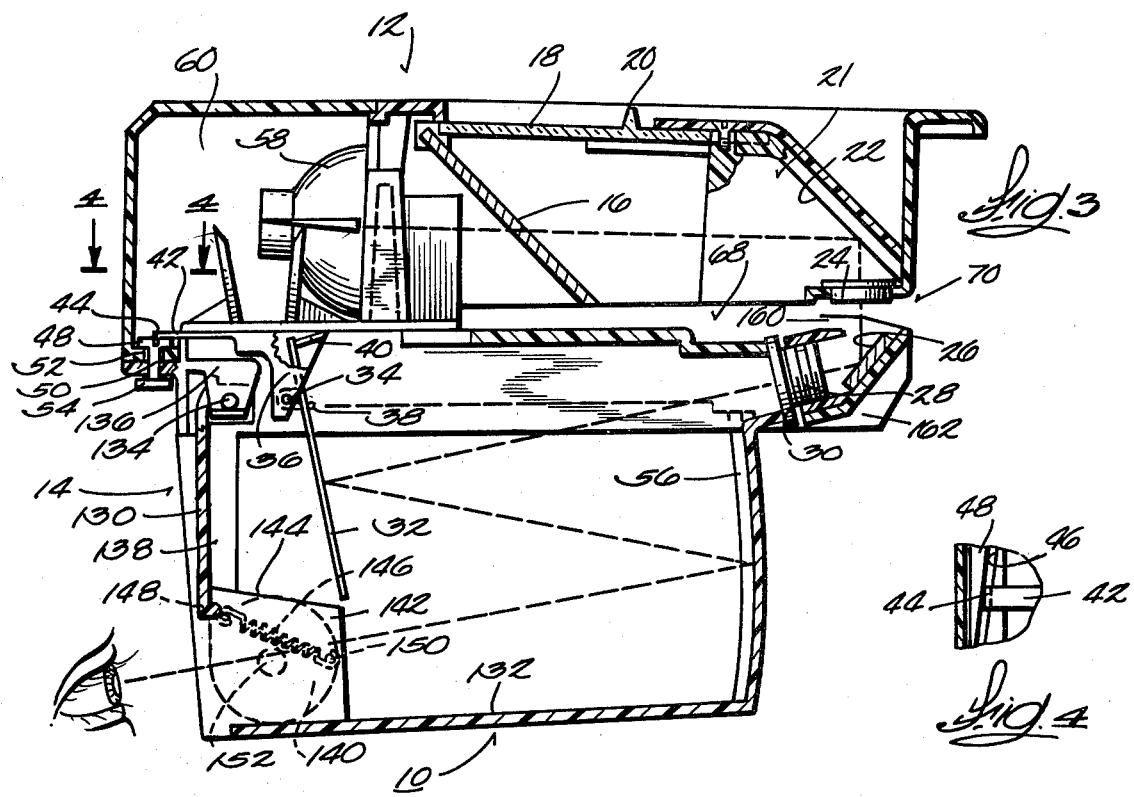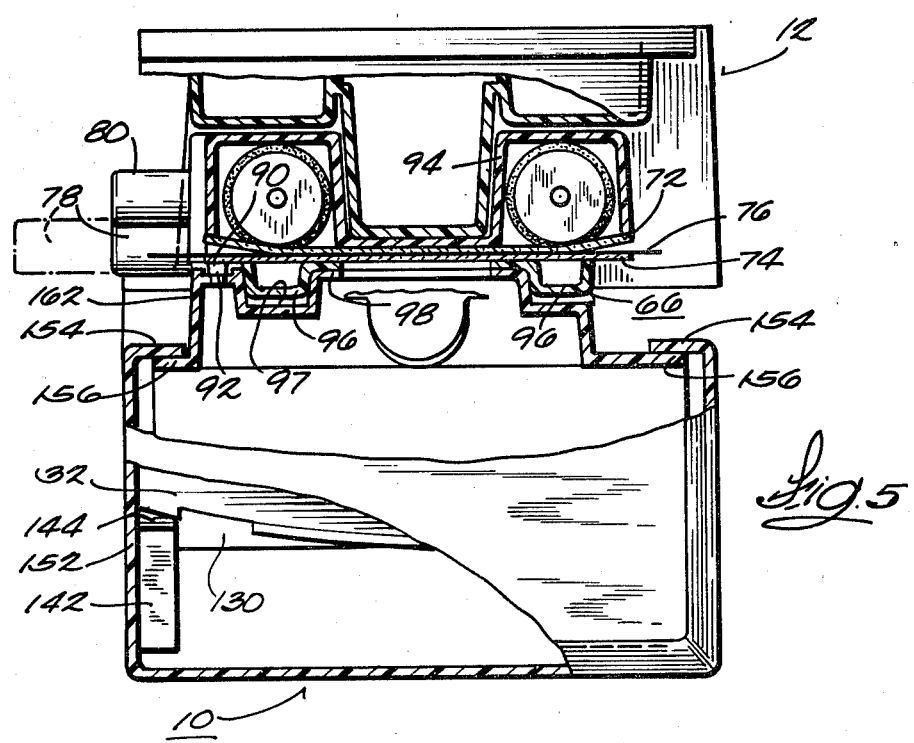

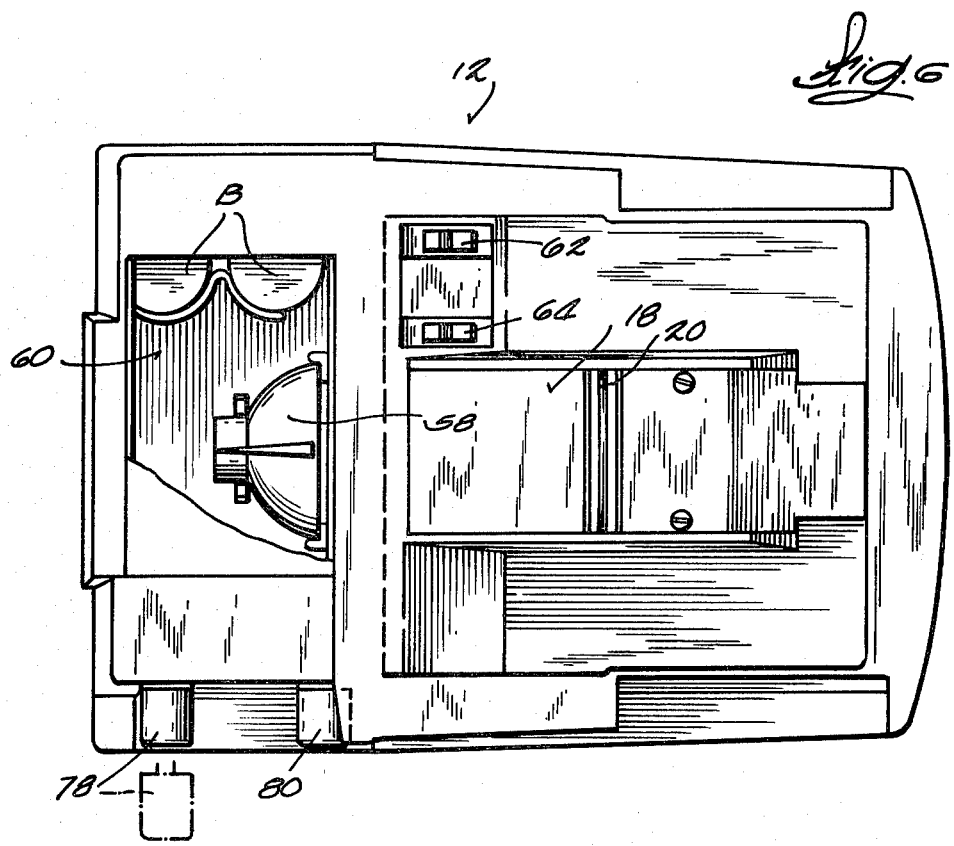
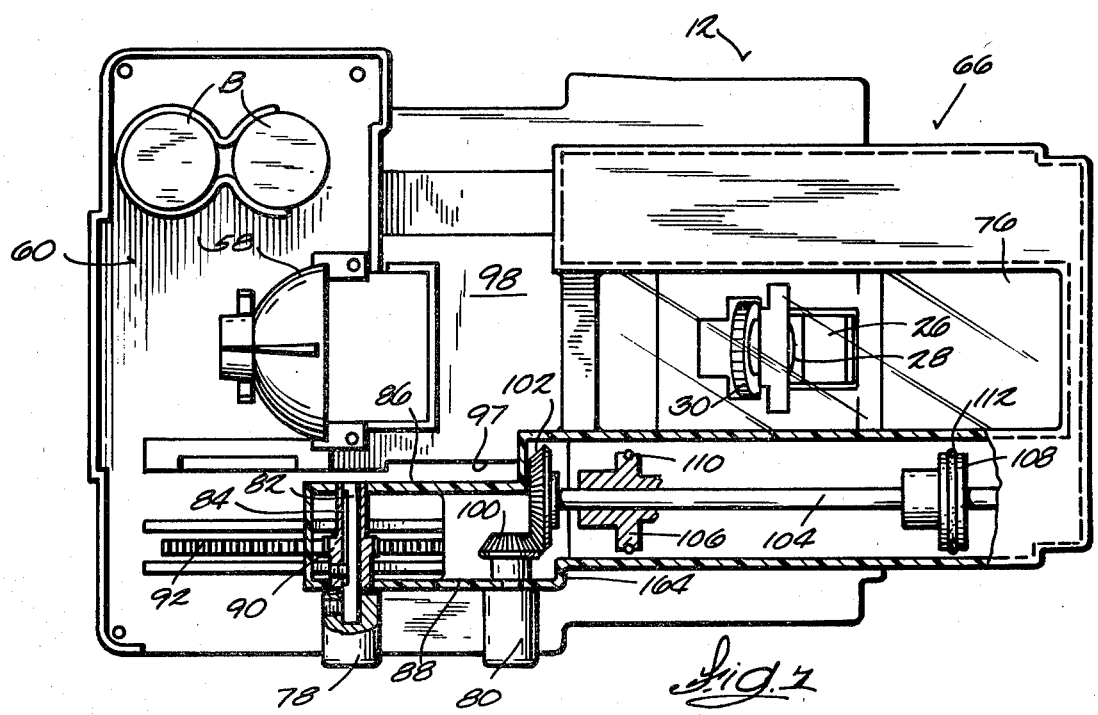

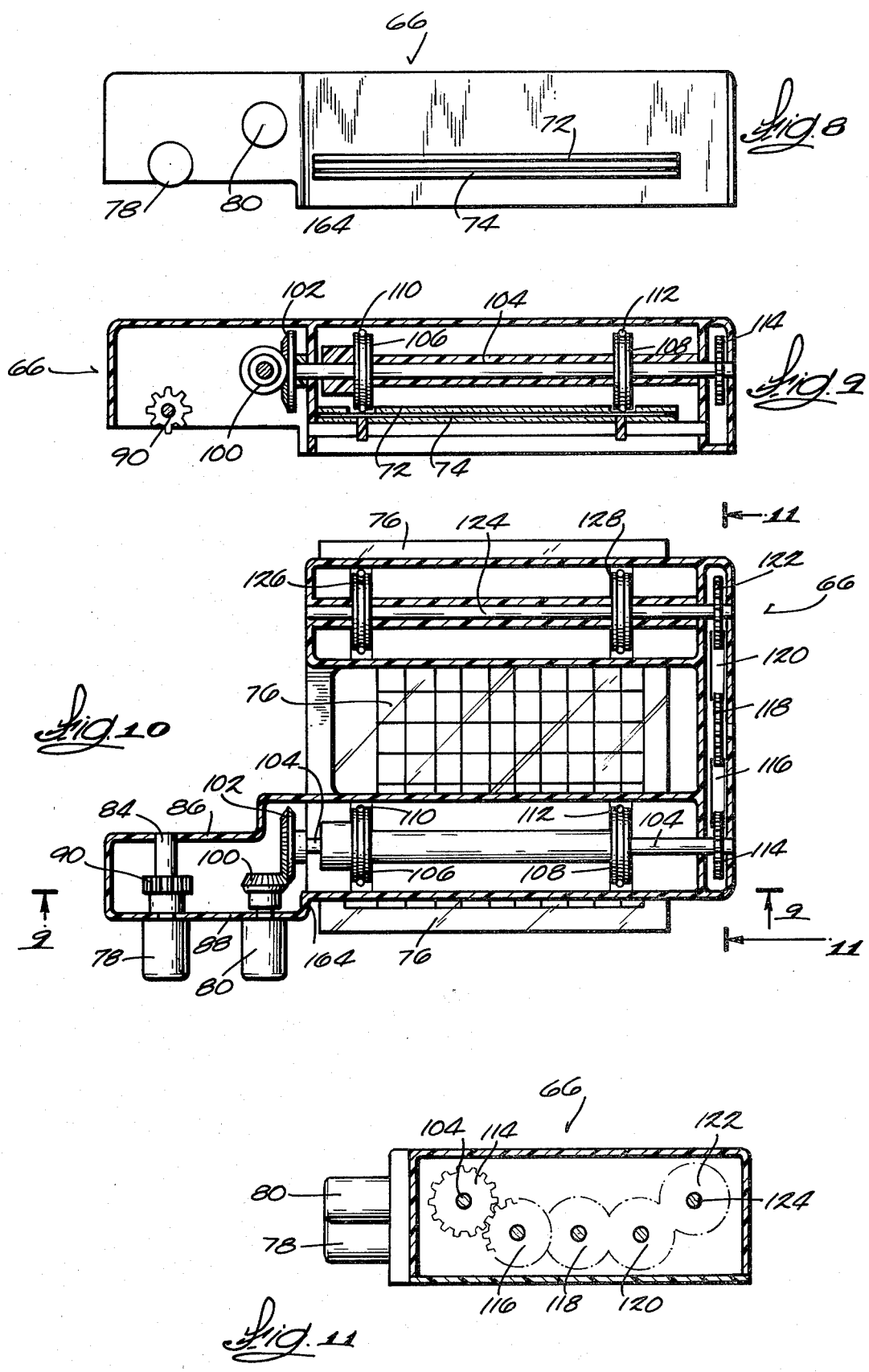

FOLDING TRANSPARENCY (MICROFICHE) VIEWER

FIELD OF THE INVENTION

This invention relates to a folding microfiche viewer meeting stringent requirements for rugged construction, compact size, adaptability to multiple sources of illumination and/or power, and usable in a wide range of ambient light conditions.

Prior folding viewers did not have to meet the design requirements met by the present invention which meets the needs of the U.S. Army for a viewer which can be stored in a combat vehicle and used in field conditions (and even battle conditions) to provide information to the crew of the combat vehicle. The size constraints rule out the usual folded projection path incorporated in the art since that approach simply would not result in a small enough viewer. Since the viewer is to be used even in bright sunlight, the prior designs were unusable since they did not provide adequate shielding from ambient light. In short, the Army requirements dictated a new and innovative approach to the problem.

SUMMARY OF THE INVENTION

The object of this invention is to provide an extremely compact viewer. This has been achieved by providing a viewer system combining a folded light path and a power mirror. By utilizing a power mirror (a mirror which magnifies an image) the overall distance between the film and the eye is less than half that which would normally be expected. Even with such an arrangement, however, the viewer is larger than the desired storage size. Therefore, provision has been made to fold the viewer. In order to accomplish this, the viewing system has been provided with a screen which folds to a storage position when the viewer is folded.

In use the viewer comprises an enclosed light box shielding the image from degradation by ambient light leaking into the viewer. The viewer is provided with a miniature bulb powered by self-contained batteries but provision is also made for operating the bulb from an AC power source plugged into the viewer with appropriate step-down and conversion of voltage. Whether operated on AC or DC, the bulb is not of great brightness if the viewer is utilized in bright sunshine, for example. The viewer has been provided with means to capture bright ambient light, (i.e. sunlight, for example) through an aperture in the viewer and reflect that light through the projecting system. The aperture just mentioned is closed when the viewer is used with AC or DC supply. When the aperture is open, means are provided to pivot a mirror into position to reflect the light through the projection system.

Images on microfiche are arranged on X-Y coordinates and the appropriate image must be positioned in the projection path. The present viewer provides a microfiche carrier permitting smooth and accurate positioning of the desired fiche image at the projecting stage. The carrier is unique in that due to the constraints of the small viewer size the mechanism for controlling movement of the fiche, in effect, has to straddle the projecting system and this has required a new carrier design.

BRIEF DESCRIPTION OF THE DRAWINGS

FIG. 3 is a vertical section through the viewer but has the microfiche carrier removed to simplify the showing.

FIG. 4 is a detailed view taken as indicated by line 4—4 in FIG. 3 showing the cam arrangement for adjusting the screen position.

FIG. 5 is a view taken from the right in FIG. 3 and has parts broken away to show details of the interior construction.

FIG. 6 is a top plan view of the viewer shown in FIG. 1.

FIG. 7 is a plan view of the viewer shown in FIG. 6 but has the top cover removed to show the arrangement of the fiche carrier and the means for moving the carrier.

FIG. 8 is a side elevation of the fiche carrier.

FIG. 9 is a sectional view taken on line 9—9.

FIG. 10 is a horizontal section through the fiche carrier.

FIG. 11 is a vertical section taken on line 11—11 in FIG. 10 showing the details of the gearing arrangement interconnecting the two pairs of drive wheels on either side of the fiche carrier.

DESCRIPTION OF THE PREFERRED EMBODIMENT

Figure 1:
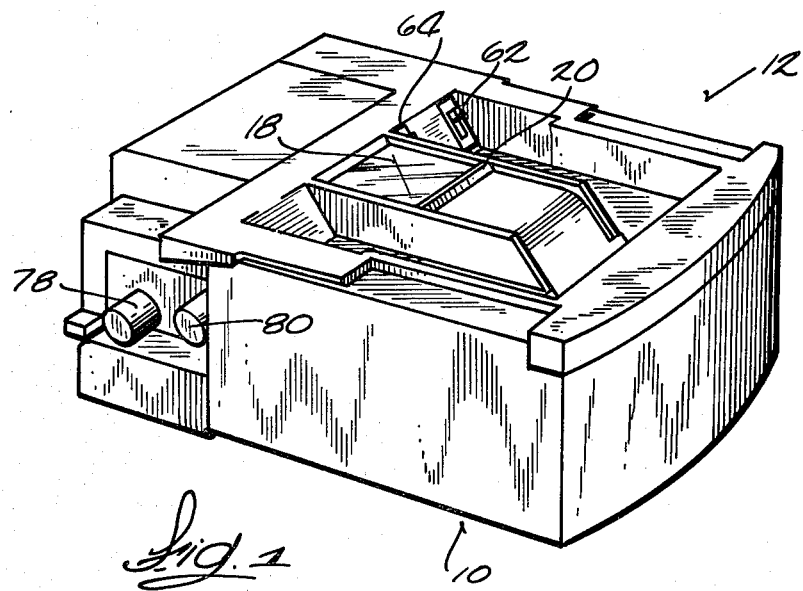
FIG. 1 is a perspective view showing the viewer in its closed position.
Figure 2:
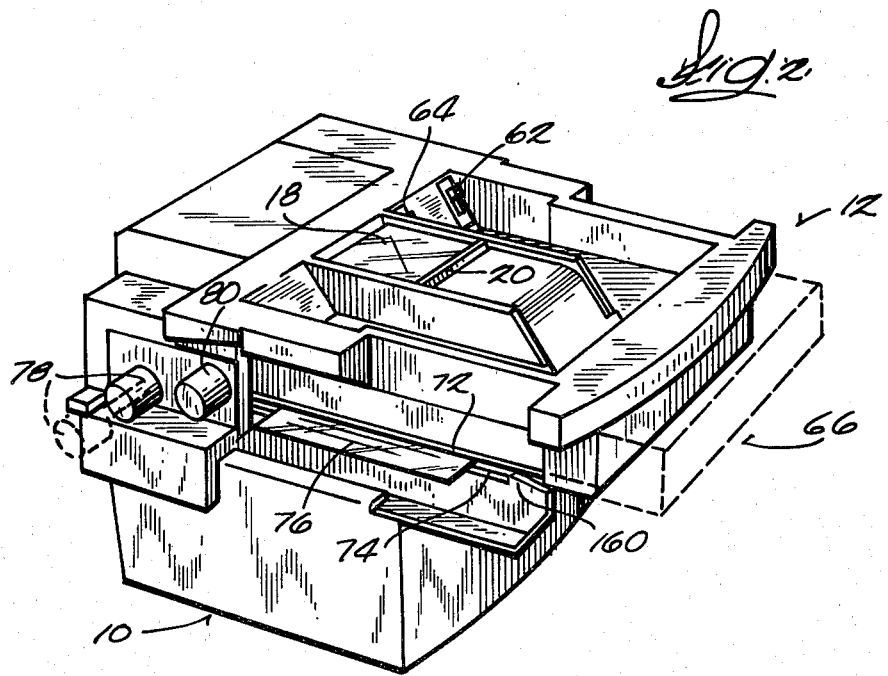
FIG. 2 is a perspective view showing the viewer in its open position for use and shows a fiche carrier in retracted position in solid lines and extending in dotted lines.
Figure 12:
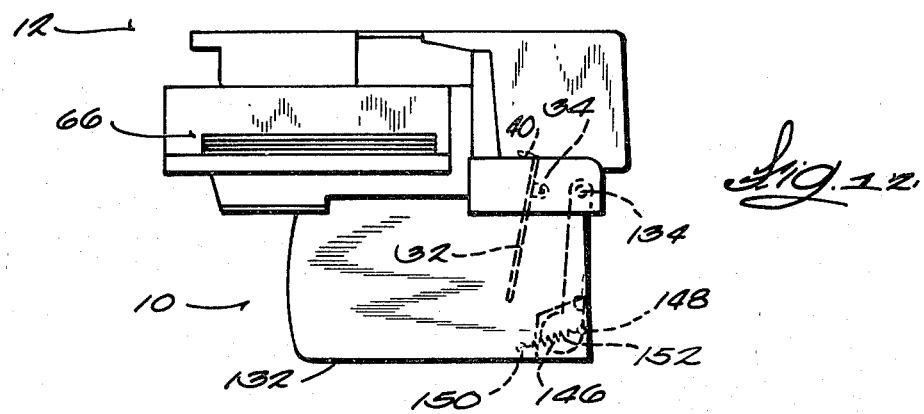
FIGS. 12, 13, 14, and 15 show the sequence of the folding action and the manner in which the screen is folded into the upper housing as the lower unit swings and over the upper housing.
Figure 13:
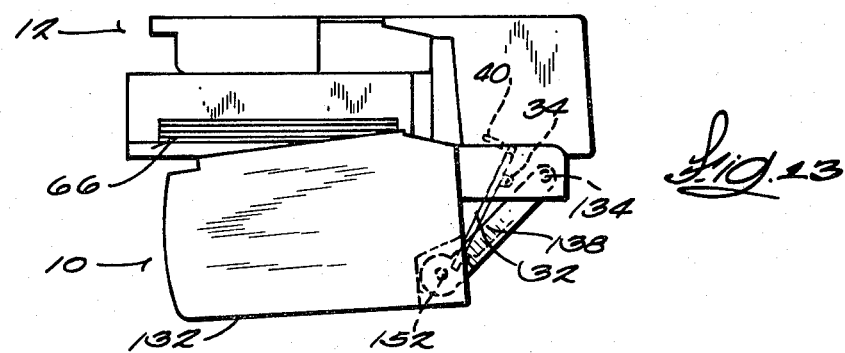
Figure 14:
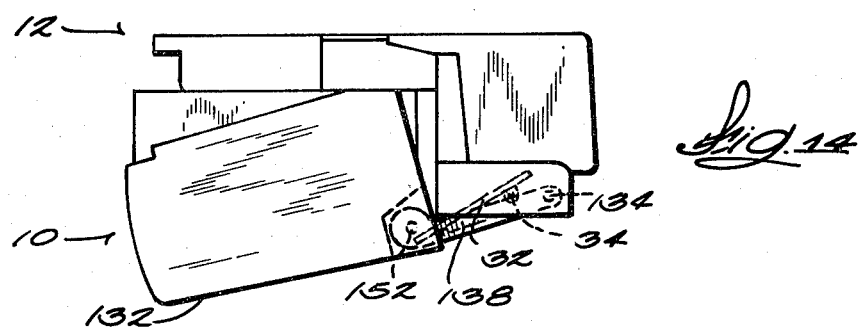
Figure 15:
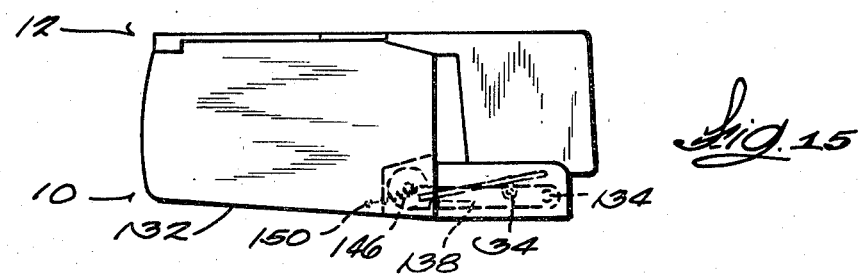

The viewing chamber 10 is connected to the main housing 12 by means of the pivotal link 14 for movement between the folded position shown in FIG. 1 and the viewing position shown in FIG. 2. The main housing 12 encloses the light source and the optical system projecting the image onto a screen which is viewed through a power mirror. The housing 12 is made up of a number of subassemblies which will not be described in detail except insofar as relevant to the invention.

Mirror 16 is pivotally mounted in the housing for movement between the position shown in FIG. 3 and a raised position and it is spring biased to the illustrated position. The top of the housing 12 is provided with a sliding member 18 having a raised rib 20 for finger engagement by the user. The portion of the slide to the left of the rib 20 is transparent or translucent and can be a Fresnel lens to enhance the light gathering power. Thus ambient light can be admitted through the transparent portion of the slide 18 to strike mirror 16 and be reflected forwardly along the light chamber 21 towards the rear of the housing to mirror 22 to be reflected downwardly through the condenser lens 24, then through the microfiche, not shown in FIG. 3, to mirror 26 and the objective lens 28 threadably mounted in the housing which is cut on the underside to allow finger engagement of the knurled rim 30 to focus the lens.

This image is projected onto the screen 32 pivotally mounted on shaft 34 carried by bracket 36 depending from the housing and provided with a spring 38 wrapped around the shaft 34 and engaging the screen to bias the screen to the position shown in FIG. 3. The upper edge of the screen engages stop 40 depending from a horizontal portion of bracket 36 to limit the movement of the screen under spring bias. Bracket 36 is slidably mounted in the housing for reciprocal movement fore and aft in FIG. 3. The bracket includes the projecting arm 42 having a finger 44 depending into the diagonal slot 46 in cam plate 48. Cam plate 48 includes post 50 depending thru a slot in the housing and engaged by knob 54 threaded into the post 50 and engageable from the exterior of the housing to slide the cam plate 48 sideways and cause the bracket 36 to move the screen fore and aft within a limited range. It has been found that this adjustment effectively accommodates various viewer interocular distances and relieves eye strain, primarily by changing the distance from the viewer's eyes to the image and changing the amount of toe-in required of the viewer's eyes.

The rear wall of the viewing chamber 10 is curved to accept power mirror 56. A power mirror is a magnifying mirror and, in this instance, magnifies approximately 2½ times. Thus the viewer looking as indicated in FIG. 3 into the mirror will see the image projected on screen 32 and this image will be magnified 2½ times while, of course, also being magnified through the projection system.

Turning back to the slide 18 at the top of the housing, if the rib 20 is moved to the left in FIG. 3, the slide will engage the upper edge of the mirror 16 and swing the mirror up to a raised position, thus blocking entry of ambient light. The portion of the slide to the right rib 20 can, if desired, be made opaque but, since the mirror is opaque when it is raised, it will block ambient light just as well. When the mirror is raised, light from the bulb inside reflector 58 can be projected onto mirror 22 and onto the system. The bulb can be powered by batteries B—B in chamber 60.

While not necessary to the present invention, it should be understood that the viewer is designed to operate in conjunction with an external power supply converting AC line voltage to the proper lamp voltage and plugged into the viewer. The viewer is provided with two switches 62, 64. One of these switches can be an on-off switch which will operate in conjunction with either the battery-power supply or the external supply but which is in series with the other switch which is a momentary switch for turning on the light when needed. This feature, of course, is not of great importance when operating on AC supply but on battery supply, the provision of the momentary switch conserves the batteries.

As can be seen in the drawings the projection system occupies the central portion of the housing. The microfiche carrier 66 is generally U-shaped in plan so that it, in effect, straddles the projection system. The carrier 66 slides into the space 68 between the upper and lower portions of the housing through the opening 70 at the rear of the housing. The carrier includes two transparent pltes 72, 74 which serve as pressure plates between which a microfiche 76 moves. It is necessary that the microfiche be able to move on two axes and the longer leg of the carrier (i.e. bottom leg in FIG. 10) is provided with two control knobs 78, 80 projecting from the side of the carrier. Knob 78 is fixed on a shaft 82 (see FIG. 7) keyed to shaft 84 rotatably journaled between the walls 86, 88 of the carrier leg so the knob 78 and shaft 82 can be moved in and out. This is done simply for easier operation of the knob (clearance otherwise being too tight for comfort). When the knob is rotated it will rotate shaft 84 which includes pinion gear 90 which engages a rack 92 on the housing. This will, therefore, rack the entire microfiche carrier fore and aft relative to the housing and, of course, move the microfiche carried by the carrier fore and aft. The carrier fits within the housing as shown in FIG. 5 in such a way that the central depressed portion 94 of the carrier slidably fits under the central optical portion of the housing and is guided thereby. Additionally, the underside of the carrier is provided with two depending rails 96, 96 which straddle a raised portion 98 of the lower part of the housing to also guide the carrier. Thus the carrier moves back and forth without cocking and moving the fiche off axis.

Lateral movement of the microfiche is accomplished by turning knob 80 which rotates beveled gear 100 meshing with gear 102 fixed on shaft 104 on which the spaced grooved drive wheels 106, 108 are fixed. O-rings 110, 112 are respectively mounted in the grooves of these drive wheels and engage the microfiche as may be seen in FIG. 5. The right hand end (FIG. 10) of the shaft 104 is provided with a gear which is part of the gear train 114, 116, 118, 120, 122. Gear 122 is mounted on shaft 124, which will rotate in the same direction as shaft 104. Shaft 124 is provided with similar drive wheels 126, 128, which also engage the microfiche. Since the drive wheels are in alignment and rotate at the same speed and direction the microfiche is moved quite accurately on the lateral axis.

Turning now to the construction of the viewing chamber, as previously noted the rear wall of the chamber is curved to accommodate the power mirror. The front wall 130 does not cover the entire front but is spaced from the lower corner as may be seen in FIG. 3. The space between the lower edge of the wall 130 and the front edge of bottom 132 is the aperture through which the viewer looks at the image on the screen 32 via the power mirror.

At the upper left corner (FIG. 3) of the viewing chamber bracket 136 fixed in the housing has a pivot on which a depending link 138 is pivoted at each front corner of the chamber behind the front wall 130. The lower end of each link terminates in a circular portion 140 pivotally connected to the sidewalls of the viewing chamber. Wall 130 and the links 138 and the circular portions 140 are a single molded part. The circular portion 140 of each link is enclosed in a small box-like enclosure 142 inside the front corners of the viewing chamber. The stiffening rib 131 on lower rear edge of wall 130 closes screen 32 as shown in FIGS. 12, 13, 14, and 15. Thus the screen 32 is engaged by the rib as the viewing chamber is folded from FIG. 12 to FIG. 13. Movement of the viewing chamber to its folded position is illustrated in the sequence shown in FIGS. 12, 13, 14, and 15. When the viewing chamber has been moved to the folded position the screen has pivoted into the space between the housing and the viewing chamber, i.e. it lies against the underside of the microfiche carrier which has to be moved to its fully retracted forward position in order to fold the viewing chamber over the housing. When thus folded the lower edge of the front wall 130 of the viewing chamber will have moved into contact with the front edge of the bottom wall 132 of the chamber to close that opening and keep dust out.

As may be seen in FIGS. 12 through 15 the spring 146 tensioned between pin 148 on link 138 and pin 150 the sidewall of the viewing chamber acts as a toggle spring since it passes on one side of the center of pivot 152. Thus in the viewing position it biases the front and bottom walls of the viewing chamber towards each other. The friction of pivot 152 is sufficient to prevent free movement of the viewing chamber relative to the link 138. When the viewing chamber is moved to the folded position the spring 146 goes over center relative to pivot 152 to tend to hold the parts in the folded position, again augmented by the friction of pivot 152. The lowermost (viewing) position of the viewing chamber relative to the housing is determined by the engagement of the turned-in lip 154 at the top of each side of the viewing chamber with the lateral flange 156 of the housing.

When the microfiche carrier is assembled into the base 68 between the upper part of the housing and the lower part of the housing, it is reciprocally moveable and lies inside of the stop 160 standing up from lower sidewall 162 of the housing. The offset 164 on the "long" side of the microfiche carrier will engage the stop 160 to limit the outward racking movement of the microfiche carrier. If it is desired to remove the microfiche carrier, it is first racked out to engage the stop and then lifted slightly to lift the offset above the stop so the microfiche carrier can then be slipped out from the space it normally occupies.

I claim:
1. A folding viewer for transparencies comprising
   a housing containing means providing a light source and a folded light path including a condenser lens and a projection lens,
   means for positioning a transparency between the lenses,
   a second housing pivotally connected to the first housing for movement between a folded position in which the second housing fits over the first housing in telescopic fashion and a viewing position in which it lies under the first housing,
   a screen depending into the second housing when the second housing is in said viewing position, said screen being positioned to have an image of the transparency projected thereon,
   a mirror fixed in the second housing,
   a viewing aperture in the second housing permitting the user to see the image on the screen as reflected by the mirror.
2. A viewer according to claim 1 in which the screen is mounted for pivotal movement during movement of the second housing to said folded position whereby the screen is pivotally moved to a storage position.
3. A viewer according to claim 2 including a spring biasing the screen to the position in which the image is projected thereon.
4. A viewer according to claim 3 in which the pivotal mounting for the screen is moveable relative to said mirror so the distance of the image from the eyes of the person using the viewer may be adjusted.
5. A viewer according to claim 1 or 4 in which the mirror is a power mirror yielding an enlarged image of the image on the screen.
6. A transparency viewer comprising
   a housing including a light source, a film stage, a projection lens, and a screen, said housing including a lower housing and an upper housing,
   mirror means directing light to the film stage and then to the screen,
   a magnifying mirror in the lower housing,
   an aperture in the lower housing permitting the user to see the image on the screen as reflected by the magnifying mirror,
   said screen being moveably mounted in the upper housing to change the projection distance from the film stage and to change the distance of the screen from the magnifying mirror to thereby change the toe-in required of the user's eyes and adjust for the user's interocular,
   said screen mounting also having provision for pivotal movement between a viewing position in which the screen depends into the lower housing and a folded position in which the screen lies between the housings permitting the lower housing to be pivoted to a folded position relative to the upper housing.
7. A transparency viewer comprising,
   a housing including a film stage,
   a light source including a light bulb and a reflector directing the light towards the film stage,
   an aperture in the housing,
   a member slidably mounted in the housing adjacent the aperture for movement between a first position in which the member closes the aperture and a second position allowing entrance of ambient light to the interior of the housing,
   a mirror pivotally mounted in the housing for movement between a raised position and an operative position in which it lies in the light path from the light bulb and reflects ambient light entering said aperture toward the film stage,
   means for causing movement of the mirror from the raised position to the operative position when the sliding member moves from its first to its second position,
   a screen in the housing,
   a projection lens receiving the image from the film stage and focusing the image on the screen.
8. A transparency viewer comprising,
   a main housing,
   a light source in the housing,
   means directing light from the source to the rear of the housing,
   a film stage at the rear of the housing,
   a projection lens mounted in the housing,
   first and second mirrors in the housing, the first mirror reflecting light from the source to the film stage and the second mirror reflecting light from the film stage forwardly thru the projection lens,
   a viewing chamber housing connected to said main housing by pivot means, said viewing chamber housing being moveable from a first position below the main housing and a second position in which it fits over the main housing in a telescopic manner,
   a screen located in the viewing chamber when the viewing chamber housing is in said first position whereby the projected image is on the screen,
   a viewing opening in the front of the viewing chamber housing,
   a mirror in the rear of the viewing chamber housing whereby a user looking thru the viewing opening can see the image on the screen reflected in the mirror.
9. A viewer according to claim 8 in which the mirror is curved to provide a magnified image of the image on the screen.
10. A viewer according to claim 9 in which the screen is pivotally mounted for movement relative to both housings when the viewing chamber housing is moved relative to the main housing to allow the screen to move to a storage position from its operative position, when the viewing chamber housing is moved over the main housing.

* * * * *